United States Patent [19]

Nygards

[11] Patent Number: 5,042,334
[45] Date of Patent: Aug. 27, 1991

[54] INTERIOR PIPE CUTTER WITH SAFETY EXTENSION

[76] Inventor: Nils Nygards, 7435 Highway 65 N.E., Minneapolis, Minn. 55432

[21] Appl. No.: 427,332

[22] Filed: Oct. 26, 1989

[51] Int. Cl.⁵ .............................................. B23D 21/14
[52] U.S. Cl. ......................................... 82/82; 30/103; 30/500; 82/100; 82/113; 83/835
[58] Field of Search ................ 83/187, 184, 178, 835, 83/665, 666, 185, 676, 574; 408/226; 166/55.7, 55.6; 82/82, 83, 100, 113; 30/500, 92, 388, 103, 104, 108

[56] References Cited

U.S. PATENT DOCUMENTS

| | | | |
|---|---|---|---|
| 2,638,320 | 5/1953 | Condra | 30/103 X |
| 2,942,092 | 6/1960 | Cammann | 166/55.7 X |
| 3,042,089 | 7/1962 | Lyons | 30/500 X |
| 3,472,229 | 10/1969 | Kuntscher | 30/103 X |
| 3,717,056 | 2/1973 | Gracin et al. | 82/82 |
| 4,307,512 | 12/1981 | Phillips | 30/103 X |
| 4,527,449 | 7/1985 | Sydlowski et al. | 408/226 X |
| 4,576,070 | 3/1986 | Fitzgerald | 30/103 X |
| 4,850,407 | 7/1989 | Inkster et al. | 83/835 X |

OTHER PUBLICATIONS

Time Saving Tool, Plumbtools, Nils Nygards, Owner, 7435 Highway 65, Minneapolis, MN 55432, date of first mailing approximately Jun. 1988.

Primary Examiner—Frank T. Yost
Assistant Examiner—Kenneth E. Peterson
Attorney, Agent, or Firm—Faegre & Benson

[57] ABSTRACT

A interior pipe cutter with depth of cutting guide and safety extension is described for cutting pipe from the inside out, while preventing the cutting blade from extending too far outside the pipe workpiece, so that it does not jump outside the pipe or do unwanted, potentially hazardous, cutting in the area outside the pipe. The cutter has a disk blade with a proximal and a distal face, the disk blade integrally formed with saw teeth extending radially outward from the disk circumference. The blade is integrally formed with a concentric dimple of diameter less than that of the disk blade, which functions as a depth of cutting guide. An elongated longitudinal shank extends axially through the center of the disk blade forming a distal shank segment and a proximal shank segment.

6 Claims, 1 Drawing Sheet

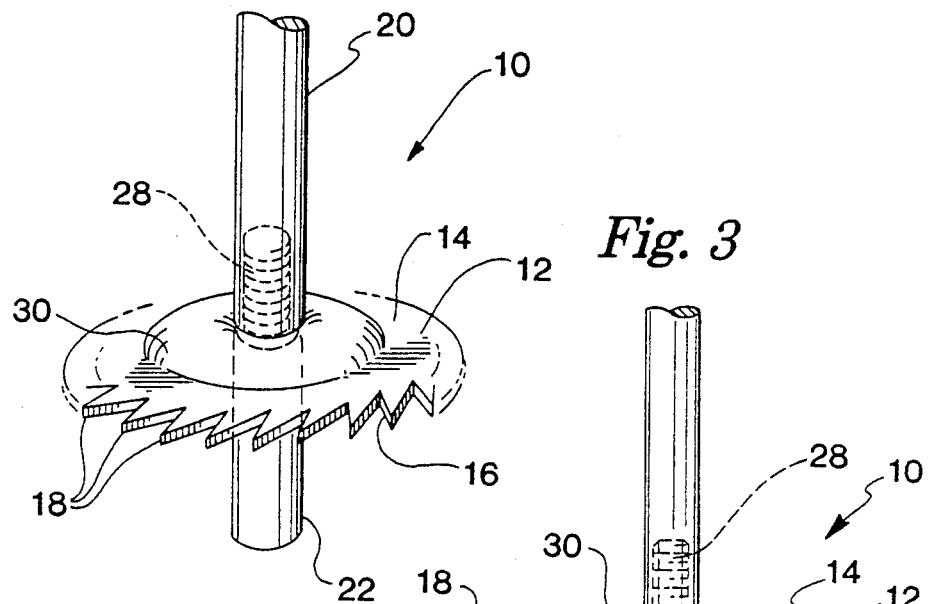
Fig. 1
Fig. 3
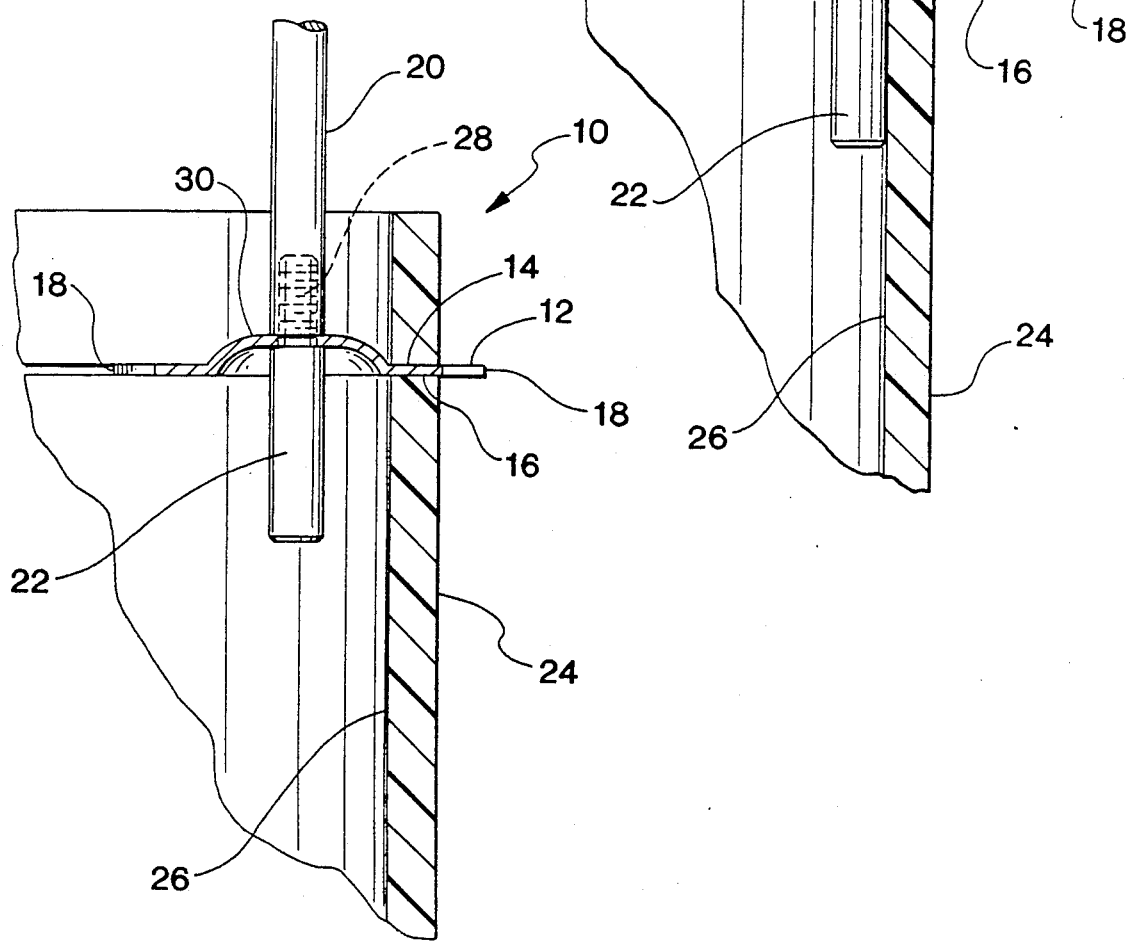
Fig. 2

1

INTERIOR PIPE CUTTER WITH SAFETY EXTENSION

FIELD OF THE INVENTION

This invention relates to an interior pipe cutter router tool for use with a standard hand drill for cutting a pipe from the inside out. This novel interior pipe cutter has a disk cutting blade integrally formed with a concentric dimple, which dimple functions as a cutting depth guide. The cutter is also provided with a distal shank member, which functions as a safety positioning extension. More particularly, the dimple guide on the blade of the present interior pipe cutter is adapted and designed to prevent the cutting blade from extending too far outside the pipe surface as the blade is gradually guided circumferentially around the inside surface of the pipe, cutting the pipe as it goes. Once the cutting tool has circumnavigated the interior surface of the pipe completing the cut to the point of origin, the dimple acts to push the cut segment apart from the remaining positioned pipe until the distal shank segment comes into longitudinally aligned contact with the inside surface of the positioned pipe. Thus, the distal shank segment functions to prevent the cutting blade from extending too far outside the pipe, so that the blade does not jump outside the pipe or present a safety or unwanted cutting hazard in the area outside the pipe.

BACKGROUND OF THE INVENTION

Often, it is necessary to cut or saw off a segment of pipe at a time or in a position when access cannot be had to the pipe exterior, such as when a pipe is below a fixed surface and cannot be reached by a hacksaw or other such pipe cutting means. This may occur in buildings constructed on concrete slabs, when an installed pipe must be cut below the floor level.

Various devices have been suggested for the purpose of cutting pipes from the inside out. Often these devices involve positioning a cutting means on the inside surface of the pipe and carefully guiding the cutting means around circumference. Since visibility of the work area is usually limited in such situations, it is often difficult to both guide the cutting means around the circumference, prevent the cutting means from extending too far outside the pipe exterior and prevent the cutting means from jumping outside the pipe interior, especially when the cutting means is a power tool.

The present inventive interior pipe cutter router tool is simple, inexpensive and relatively easy to manufacture, and performs its function with time and cost saving speed and efficiency, with accuracy and safety. The present tool can be used with a standard hand drill to completely, cleanly and safely cut an end segment of plastic pipe from the inside out.

SUMMARY OF THE INVENTION

An interior pipe cutter router tool with a cutting guide and a safety extension comprises a disk blade having a proximal and a distal face. The disk blade is integrally formed with saw teeth extending radially outward from the disk circumference. The disk blade is also integrally formed with a concentric dimple of diameter less than that of the disk blade. The dimple is of convex form on the proximal face and concave form on the distal face of the disk blade. The dimple functions as a cutting guide to restrain the depth of cut of the blade, as well as for strength reinforcing of the blade. An elongated longitudinal shank extends axially through the center of the disk blade. The shank forms a distal shank segment extending axially from the distal face of the disk blade, and a proximal shank segment extending axially from the proximal face of the disk blade.

The interior pipe cutter router tool is adapted to be operatively retained by the proximal shank within a chuck of a standard hand drill, for positioning the disk blade within the interior of a cylindrical pipe for cutting the pipe from the inside out. The saw teeth are sized and adapted for initially cutting through the pipe from the inside out until the leading edge of the dimple is in contact with the pipe interior surface. The cutter is then guided to circumnavigate the pipe inside surface completely around to the point of the initial cut. When the saw teeth have cut through the entire circumference of the pipe interior, the distal shank segment then comes into longitudinally aligned contact with the pipe interior surface, preventing the cutter tool from jumping outside the pipe interior and preventing the cutting blade from performing any unwanted cutting in the area outside the pipe.

BRIEF DESCRIPTION OF THE DRAWINGS

FIG. 1 is a perspective view of the interior pipe cutter router tool of this invention.

FIG. 2 is a side view of the interior pipe cutter router tool shown in use in cutting around the interior surface of a pipe.

FIG. 3 is a side view of the interior pipe cutter router tool shown at the completion of cutting around the interior surface of a pipe.

DETAILED DESCRIPTION OF THE PREFERRED EMBODIMENT

The interior pipe cutter with safety extension 10 of this invention is shown in a perspective view in FIG. 1. Interior pipe cutter 10 comprises disk blade 12 having a proximal 14 and a distal face 16 integrally formed with saw teeth 18 extending radially outward from the disk 12 circumference. The disk blade 12 is also integrally formed with a concentric dimple 30 of diameter less than that of the disk blade 12. The dimple 30, as shown in the Figures, is of convex form on the proximal face 14 and of concave form on the distal face 16 of the disk blade 12. An elongated longitudinal shank extends axially through the center of the disk blade 12, forming a proximal shank segment 20 extending axially from the proximal face 14 and a distal shank segment 22 extending axially from the distal face 16 of the disk blade 12.

The interior pipe cutter 10 is adapted to be operatively retained by the proximal shank segment 20 within a chuck of a standard hand drill, not shown, for positioning the disk blade 12 within the interior of a cylindrical pipe 24 for cutting the pipe 24 from the inside out. The dimple 30 functions as a cutting guide to restrain the depth of cut of the saw teeth 18, as well as a strength reinforcement of the disk blade 12 itself. The distal shank segment 22 is adapted to function as a cutting safety extension. The diameter of the disk blade 12 is chosen to be equal to or less than the interior diameter of cylindrical pipe 24. With the proximal shank segment 20 operatively retained within the chuck of a standard hand drill (not shown), and the interior pipe cutter 10 positioned inside the pipe 24 with saw teeth 18 against the interior surface 26 of pipe 24, when the hand drill is activated saw teeth 18 will cut through pipe 24 from the inside out until the leading edge of dimple 30 comes into contact with the interior surface 26 of pipe 24, as illustrated in FIG. 2. The dimple 30 will then function as a depth of cutting guide as the disk blade 12 is guided to cut around the circumference of the interior surface of pipe 24. When the disk blade 12 has completely circumnavigated the interior surface 26 of pipe 24 to the point of initial cut, dimple 30 will function to push the cut segment apart from the remaining positioned pipe until the distal shank segment 22 comes into longitudinally aligned contact with the interior surface 26 of pipe 24, as illustrated in FIG. 3. The distal shank segment 22 will then function to prevent the cutter 10 from jumping outside pipe 24 and to prevent the disk blade 12 from doing any unwanted and potentially hazardous cutting in the area outside pipe 24.

Preferably, the saw teeth 18 are evenly spaced around the disk blade 12 circumference and are raked in the direction of disk cutting rotation. The proximal shank segment 20 is also preferably of hexagonal cross-section to facilitate retention within the chuck of a standard hand drill. The distal shank segment 22 may be releasably retained through the disk blade 12 in longitudinal alignment with the proximal shank segment 20, as for example by means of screw threading 28 of the distal shank segment 22 to the proximal shank segment 20, which screw threading 28 also functions to retain the disk blade 12 in position.

The interior pipe cutter of this invention can be sized for use with pipes of any given diameters, with the diameter of the disk blade chosen to be equal to or less than the interior diameter of the pipe to be cut. Typical sizes of pipes with which the interior pipe cutter of this invention may be used are 1" through 4" nominal. The interior pipe cutter may be formed of any material sufficient to withstand the rotating pressure and be formed to cutting edges to effect the desired cutting and rotating action, such as tempered spring steel. The interior pipe cutter may be used for inside out cutting of pipes formed of a variety of plastic and synthetic resin materials, including PVC and ABS.

What is claimed is:

1. A pipe cutter for cutting pipe from inside thereof which comprises only:
    a disk blade having a proximal and a distal face integrally formed with saw teeth extending radially outward from a disk circumference, said disk blade integrally formed in one piece with a concentric dimple of diameter less than that of the disk blade; and
    a longitudinal shank extending axially through a center of the disk blade forming a distal shank segment and a proximal shank segment; the cutter adapted to be operatively retained for rotational operation by the proximal shank segment thereof for positioning the disk blade within the interior of a pipe for cutting the pipe from the inside out, such that the disk blade diameter is sized to be no greater than the pipe interior diameter, the saw teeth are sized and adapted for initially cutting through the pipe from the inside out until the dimple leading edge is in contact with the pipe interior surface as the cutter is guided to circumnavigate the pipe inside surface to the initial cut, at which the distal shank segment comes into longitudinally aligned contact with the inside surface of the pipe.

2. A pipe cutter according to claim 1, wherein the saw teeth are evenly spaced around the disk circumference.

3. A pipe cutter according to claim 1, wherein the distal shank segment is releasably retained through the disk blade in longitudinal alignment with the proximal shank segment.

4. A pipe cutter according to claim 3, wherein the distal shank segment is releasably retained by means of screw threading of the distal shank segment to the proximal shank segment, which means also retains the disk blade.

5. In a pipe cutter for cutting pipe from inside thereof which comprises:
    a disk blade having a proximal and a distal face integrally formed with saw teeth extending radially outward from a disk circumference, said disk blade integrally formed in one piece with a concentric dimple of diameter less than that of the disk blade; and
    a longitudinal shank extending axially through a center of the disk blade forming a proximal shank segment;
    the cutter adapted to be operatively retained by the proximal shank segment by disk blade rotational powering means for positioning the disk blade within the interior of a pipe for cutting the pipe from the inside out, such that the disk blade diameter is sized to be no greater than the pipe interior diameter, the saw teeth are sized and adapted for initially cutting through the pipe from the inside out until the dimple leading edge is in contact with the pipe interior surface as the cutter is guided to circumnavigate the pipe inside surface to the initial cut, at which the dimple functions to push a cut pipe segment apart from a remaining positioned pipe segment;
    the improvement comprising:
    a distal shank segment in axial alignment with the proximal shank segment extending distally from the distal face of the disk blade; and
    the distal shank segment releasably retained through the disk blade in longitudinal alignment with the proximal shank segment to retain the disk blade in position;
    such that when the disk blade has circumnavigated the pipe inside surface to the initial cut and the dimple has functioned to push a cut pipe segment apart from a remaining positioned pipe segment, the distal shank segment comes into longitudinally aligned contact with the inside surface of the pipe to prevent the cutter from jumping outside the remaining positioned pipe segment and to prevent the disk blade from doing any unwanted cutting outside the remaining positioned pipe segment.

6. A pipe cutter according to claim 5, wherein the distal shank segment is releasably retained by means of screw threading of the distal shank segment to the proximal shank segment, which means also retains the disk blade.

* * * * *